United States Patent
Ashman et al.

(10) Patent No.: US 11,463,416 B1
(45) Date of Patent: Oct. 4, 2022

(54) AUTOMATIC DETECTION OF PERSONAL INFORMATION IN CLOUD-BASED INFRASTRUCTURE CONFIGURATIONS

(71) Applicant: Amazon Technologies, Inc., Seattle, WA (US)

(72) Inventors: Kevin Ashman, Renton, WA (US); Charles Andrew Schuetz, Piedmont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 16/713,804

(22) Filed: Dec. 13, 2019

(51) Int. Cl.
| *H04L 9/40* | (2022.01) |
| *H04L 67/306* | (2022.01) |
| *H04L 67/00* | (2022.01) |
| *G06F 21/62* | (2013.01) |
| *H04L 67/133* | (2022.01) |
| *H04L 67/565* | (2022.01) |

(52) U.S. Cl.
CPC ...... *H04L 63/0421* (2013.01); *G06F 21/6245* (2013.01); *H04L 67/133* (2022.05); *H04L 67/306* (2013.01); *H04L 67/34* (2013.01); *H04L 67/565* (2022.05)

(58) Field of Classification Search
CPC ............... H04L 63/0421; H04L 63/102; H04L 67/2823; H04L 67/306; H04L 67/34; H04L 67/40; H04W 4/21; G06F 21/552
USPC .......................................................... 726/26
See application file for complete search history.

(56) References Cited

U.S. PATENT DOCUMENTS

| 8,151,360 | B1 * | 4/2012 | Kishore | H04L 67/1097 |
| | | | | 726/28 |
| 8,611,222 | B1 * | 12/2013 | Mukerji | H04L 69/321 |
| | | | | 370/235 |

(Continued)

FOREIGN PATENT DOCUMENTS

| DE | 202017105672 U1 * | 1/2018 | ............... G06N 5/04 |
| DE | 102017121712 A1 * | 3/2018 | ............. G06N 20/00 |

(Continued)

OTHER PUBLICATIONS

Cavendish et al., "New Transport Services for Next-Generation SONET/SDH Systems", 2002 (Year: 2002).*

(Continued)

*Primary Examiner* — Nam T Tran
(74) *Attorney, Agent, or Firm* — Eversheds Sutherland (US) LLP

(57) ABSTRACT

Devices, systems, and methods are provided detecting personal information in cloud-based infrastructure configuration. A method may include sending, by a computer-based system, a first request to a first service associated with the computer-based system, the first request associated with first application programming interface (API) call data. The method may include receiving the first API call data from the first service. The method may include determining, based on the first API call data, first data associated with the first service, and determining that the first data includes personal information. The method may include sending a message to a device, the message indicative of the personal information. The method may include receiving a second request to modify the first data, and modifying the first data based on the second request.

20 Claims, 8 Drawing Sheets

(56) References Cited

U.S. PATENT DOCUMENTS

| | | | | |
|---|---|---|---|---|
| 8,719,591 | B1* | 5/2014 | Emigh | G06F 21/335 |
| | | | | 713/193 |
| 9,419,946 | B2* | 8/2016 | Udani | H04W 4/029 |
| 9,471,404 | B1* | 10/2016 | Ambrosio | G06F 9/543 |
| 9,491,311 | B1* | 11/2016 | Sharma | H04L 12/1403 |
| 9,906,627 | B2* | 2/2018 | Anil | H04L 63/0428 |
| 10,063,585 | B2* | 8/2018 | Salajegheh | G06F 21/552 |
| 10,404,757 | B1* | 9/2019 | Horton | H04L 63/20 |
| 10,491,582 | B1* | 11/2019 | Rule | H04L 9/3226 |
| 10,674,476 | B1* | 6/2020 | Baker, Jr. | H04L 51/14 |
| 11,055,727 | B1* | 7/2021 | Kumar | G06Q 30/0185 |
| 2003/0046179 | A1* | 3/2003 | Anabtawi | G06Q 30/0625 |
| | | | | 705/26.5 |
| 2004/0162904 | A1* | 8/2004 | Eida | H04L 67/306 |
| | | | | 709/204 |
| 2004/0215717 | A1* | 10/2004 | Seifert | H04L 67/101 |
| | | | | 709/203 |
| 2006/0174119 | A1* | 8/2006 | Xu | H04L 63/1483 |
| | | | | 713/170 |
| 2009/0003349 | A1* | 1/2009 | Havemann | H04L 45/56 |
| | | | | 370/392 |
| 2010/0036834 | A1* | 2/2010 | Bandas | G01C 21/3655 |
| | | | | 707/724 |
| 2010/0223341 | A1* | 9/2010 | Manolescu | H04L 51/063 |
| | | | | 709/206 |
| 2010/0268833 | A1* | 10/2010 | Nakayama | H04M 7/0069 |
| | | | | 709/228 |
| 2012/0222083 | A1* | 8/2012 | Vaha-Sipila | G06F 21/53 |
| | | | | 726/1 |
| 2012/0226749 | A1* | 9/2012 | Dale | H04L 63/102 |
| | | | | 709/204 |
| 2013/0191500 | A1* | 7/2013 | Shafi | H04L 67/02 |
| | | | | 709/217 |
| 2013/0250959 | A1* | 9/2013 | Van Wyk | H04L 47/365 |
| | | | | 370/393 |
| 2013/0318199 | A1* | 11/2013 | Le Jouan | H04L 51/28 |
| | | | | 709/217 |
| 2014/0245425 | A1* | 8/2014 | Potlapally | H04L 9/0869 |
| | | | | 726/14 |
| 2015/0118992 | A1* | 4/2015 | Wyatt | H04W 12/08 |
| | | | | 455/410 |
| 2016/0028636 | A1* | 1/2016 | Soni | H04L 29/06095 |
| | | | | 370/235 |
| 2016/0352867 | A1* | 12/2016 | Subbarayan | H04L 41/0893 |
| 2017/0098097 | A1* | 4/2017 | Van Eerd | H04W 8/183 |
| 2017/0250959 | A1* | 8/2017 | Gordon | H04L 63/0421 |
| 2017/0255792 | A1* | 9/2017 | Kim | G06F 21/6245 |
| 2017/0293469 | A1* | 10/2017 | Attaluri | G06F 16/221 |
| 2018/0069825 | A1* | 3/2018 | Purves | H04L 51/046 |
| 2018/0082683 | A1* | 3/2018 | Chen | G06F 21/6263 |
| 2018/0150443 | A1* | 5/2018 | Singleton | G06F 9/451 |
| 2018/0268115 | A1* | 9/2018 | Zhang | G06F 9/455 |
| 2018/0341722 | A1* | 11/2018 | Satpathy | H03M 7/6005 |
| 2019/0075130 | A1* | 3/2019 | Petry | H04L 67/2814 |
| 2019/0089784 | A1* | 3/2019 | Bloy | G06Q 20/10 |
| 2019/0149619 | A1* | 5/2019 | Lisac | H04L 67/1097 |
| | | | | 709/203 |
| 2019/0342336 | A1* | 11/2019 | Finkelstein | H04L 63/20 |
| 2020/0036811 | A1* | 1/2020 | Dar | H04L 67/10 |
| 2020/0092297 | A1* | 3/2020 | Bolle | H04L 67/306 |
| 2020/0107169 | A1* | 4/2020 | Chin | H04L 61/2038 |
| 2020/0220937 | A1* | 7/2020 | Jain | H04L 67/146 |
| 2020/0311299 | A1* | 10/2020 | Amar | H04L 9/3213 |
| 2021/0007038 | A1* | 1/2021 | Li | H04W 76/00 |
| 2021/0166246 | A1* | 6/2021 | Fournier | G06Q 30/02 |
| 2021/0279368 | A1* | 9/2021 | Suzuki | G06F 21/602 |

FOREIGN PATENT DOCUMENTS

| | | | | |
|---|---|---|---|---|
| JP | 2017146849 A | * | 8/2017 | H04L 63/308 |
| KR | 20030051219 A | * | 6/2003 | G06Q 10/107 |
| KR | 20190086056 A | * | 7/2019 | H04L 51/02 |
| WO | WO-2017141618 A1 | * | 8/2017 | G06F 21/33 |
| WO | WO-2019099079 A1 | * | 5/2019 | H04N 21/25891 |

OTHER PUBLICATIONS

RapidAPI, "What is an API Call?", 2021 (Year: 2021).*

Wikipedia, "API", 2021 (Year: 2021).*

Anastasis Shuba, Evite Bakopoulou, Milad Asgari Mehrabadi, Hieu Le, David Choffnes, and Athina Markopoulou, "AntShield: On-Device Detection of Personal Information Exposure", Mar. 3, 2018, https://arxiv.org/abs/1803.01261. (Year: 2018).*

* cited by examiner

AUTOMATIC DETECTION OF PERSONAL INFORMATION IN CLOUD-BASED INFRASTRUCTURE CONFIGURATIONS

BACKGROUND

Some computer systems may be configured to route personal data, potentially allowing for inadvertent disclosure of the personal data. For example, a computer system user accidentally may configure systems to include personal health information. Detecting and correcting computer system configurations that include sensitive personal data can be inefficient and invasive to computer system users. Therefore, computer systems and computer system users may benefit from enhanced detection of personal and other sensitive information.

Figure 1:
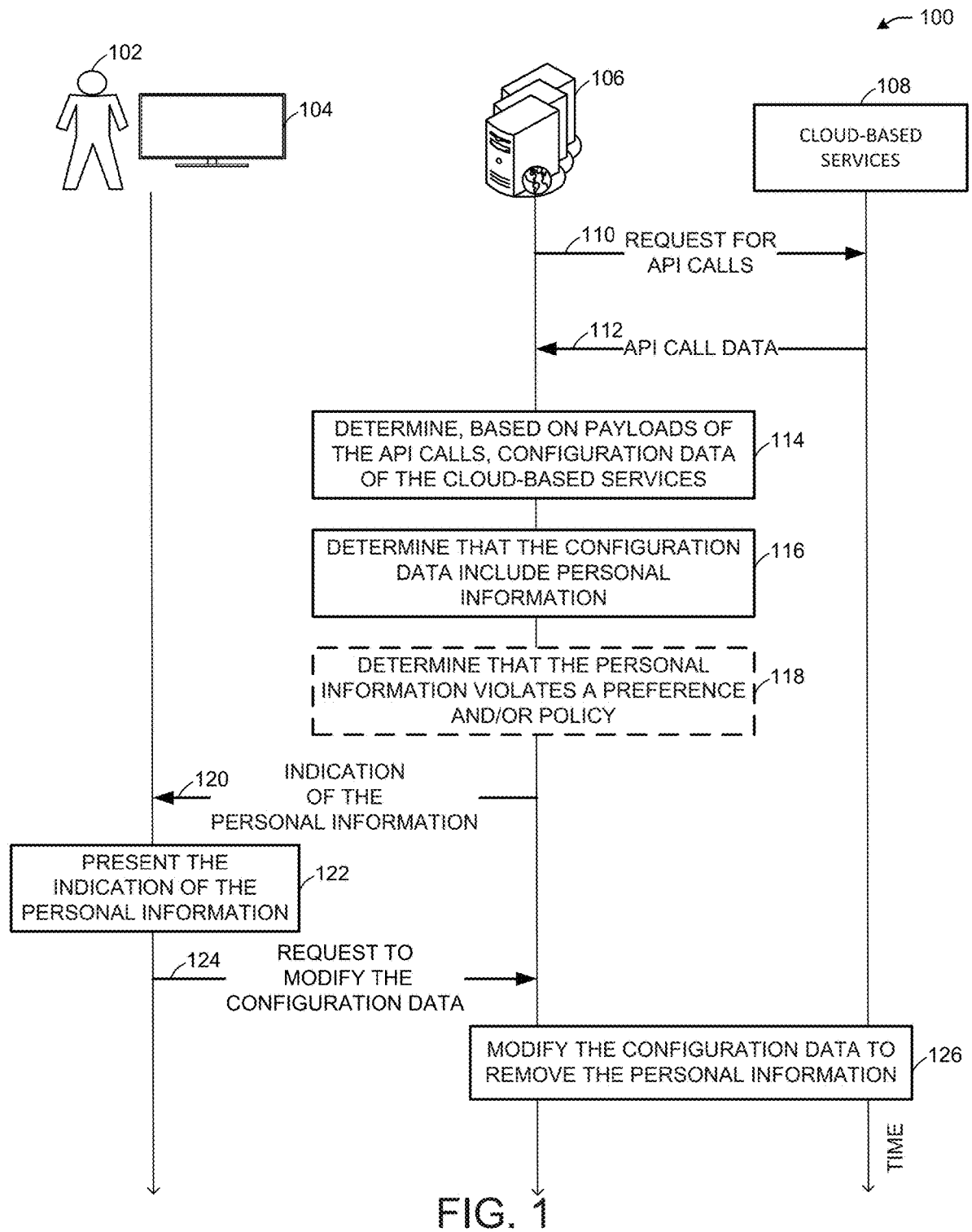
FIG. 1 illustrates an example process for detecting personal information in cloud-based infrastructure configurations, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for detecting personal information in cloud-based infrastructure configuration.

Computer services such as cloud-based computing services may provide user access to a variety of applications and services hosted by cloud-based resources. To route users to web-based applications, computer services may use routing services, such as domain name system (DNS) web services that may translate a uniform resource locator such as www.website.com to a numeric Internet protocol (IP) address to connect a device to another device. Routing services may connect users to infrastructure executing in a cloud-based environment, such as elastic computing instances, elastic load balancers, cloud storage services, and the like, and to resources outside of the cloud-based environment.

Routing service logic and other cloud-based computer architecture configurations may expose personal information, such as personally identifiable information (PII) and personal health information (PHI). A cloud-based computer user may configure routing service logic to include patient health information or social security numbers in the payload of an application programming interface (API) call, and such sensitive information may be routed according to routing service logic, risking incidental exposure to such sensitive information. For example, a cloud storage service configuration may include prefixes (e.g., folders) for patients, with the pattern <patient name>_<Social Security Number>. This may be a convenient scheme for a user, but it unnecessarily may expose PII at the configuration level of the cloud storage service.

Therefore, computer-based systems and users may benefit from enhanced detection of personal information in a cloud-based infrastructure.

In one or more embodiments, to enhance user and customer security for cloud-based computing systems, a system automatically may detect the undesirable presence of PII and PHI in cloud-based computing architecture configurations. With user consent and according to applicable laws and policies, a system proactively may evaluate API calls (e.g., JSON payloads of API calls) for cloud-based services and resources to identify the presence of PII and PHI in cloud-based computing architecture configurations, and may notify users of the risk of such configurations, allowing users to modify the configurations or confirm that the information is safe to include. For any particular region or user account, the services and resources available in a cloud-based computing environment may provide API call data based on requests made by the system. For example, the system iteratively may request API call data for any particular service based on location, applicable user accounts, post endpoints (e.g., the endpoint to which data is sent), and whether configurations for any services or resources have changed in a particular time period (e.g., since the last request for API call data). The services and resources may provide the API call data to the system for analysis, which the system may perform in parallel to analyze multiple API payloads at a time. Whereas some systems may analyze documents (e.g., documents with doctors' notes on a patient), an enhanced system may analyze metadata used by cloud-based services to detect PII and/or PHI. For example, metadata may include information stored in customer accounts, a description of cloud-based services (e.g., cloud storage tags, virtual private clouds, etc.), and other information. The system may query configurations and scan API call payloads for the configuration information.

In one or more embodiments, a system may use machine learning and/or natural language processing to identify PII and PHI in API payloads. For example, PII and PHI may be defined by policies, and users may customize which information to identify as sensitive. Machine learning may be used to determine whether to present identified PII and PHI to a user for possible modification of service configurations, or whether a user is not likely to modify configurations based on the detection of some PII and PHI (e.g., based on past user actions). Serverless cloud-based computers may be used to remediate detected PHI and/or PII. Real-time hashing may be used to replace PHI and/or PII with other information. For example, a hash may be used to replace the detected PHI and/or PII with other information. A look-up table may facilitate the hashing process by providing a mapping between the replacement information and personal information to be replaced.

In one or more embodiments, to access the API payloads, the system may execute a daemon that has been given access to cloud-based services. For example, the daemon may be provided "read" access or a role with read access to a service. The daemon may query configuration information in API payloads. Some services may provide null results, but some services may provide API payloads for analysis. In this manner, the system may collect metadata for any endpoint in a cloud-based system by acting as a spider to crawl any authorized or trusted service in a cloud-based computing system.

In one or more embodiments, the system may detect when data has moved from one region to another based on the API payloads. When a policy defines whether data, such as PII and/or PHI is allowed to be sent to some locations and not to other locations, the system may rely on the policy to determine whether data in an API payload was sent to a post endpoint that violates the policy (e.g., a forbidden endpoint), or whether the data was sent outside of the origin region. When the transfer of sensitive data violates a policy defining where the data may be sent, the system may notify a user.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process for detecting personal information in cloud-based infrastructure configurations, in accordance with one or more example embodiments of the present disclosure.

Referring to FIG. 1, the process 100 may include a user 102 of a device 104, a system 106 (e.g., a network-based system), and one or more cloud-based services 108 of the system 106. For example, the system 106 and the one or more cloud-based services 108 may be accessed as a cloud-based network using the device 104, and the cloud-based network may facilitate remote access of the one or more cloud-based services 108 using the device 104. The system 106 periodically may analyze the one or more cloud-based services 108 for unwanted inclusion of personal information (e.g., PII, PHI, etc.) in the configuration settings of the one or more cloud-based services 108. For example, at step 110, the system 106 may send a request to the one or more cloud-based services 108 for API call data (e.g., records of API calls made using the one or more cloud-based services 108). At step 112, the one or more cloud-based services 108 may send the API call data to the system 106 (e.g., any API call data, API call data for API calls made since a previous request, etc.). The API call data may include information in API calls made using the one or more cloud-based services 108, such as the API call payloads (e.g., JSON payloads or other types of API payloads). At step 114, the system 106 may determine, based on the payloads of the API call data, configuration data of the one or more cloud-based services 108.

Still referring to FIG. 1, at step 116, the system 106 may determine that the configuration data (e.g., metadata used at the configuration level of a service) of the one or more cloud-based services 108 include personal information (e.g., PII, PHI, etc.), for example, in the configuration data of the one or more cloud-based services 108. The type of personal information searched for by the system 106 may be predefined PII and/or PHI, and may include other sensitive information defined by a user and/or one or more policies accessible to the system 106. At step 118, optionally, the system 106 may determine that the personal information violates a preference and/or policy. For example, the user 102 may provide user preferences indicating which personal information to allow and not allow in the configuration data, or the system 106 may determine based on past selections made by the user 102 whether the identified personal information is likely to be allowed by the user 102 if the user 102 were presented with an option to modify the use of the personal information. A policy may define rules for which personal information is allowed to be used by configuration data of the one or more cloud-based services 108. At step 120, the system 106 may send an indication of the personal information (and the one or more cloud-based services 108 using the personal information) to the device 104 to present, as step 122, to the user 102, allowing the user 102 to choose to modify the use of the personal information. At step 124, the device 104 may receive and send to the system 106 (or to the one or more cloud-based services 108) a request to modify the configuration data that includes the personal information. At step 126, the system 106 and/or the one or more cloud-based services 108 may modify the configuration data to remove the personal information based on the user's request. The modification may include executing a computer function or script that causes removal of or changes to the personal information, or may include using real-time hashing to replace the personal information with other information that is permitted. For example, the personal information may be replaced with an injection of a hash of data that maps to the personal information using a look-up table.

In one or more embodiments, the system 106 may identify the one or more cloud-based services 108 configured by the user 102 and/or available in a given location, and to which to send requests at step 110. The one or more cloud-based services 108 may include network services, cloud computing services, cloud storage services, and domain routing services. For example, the network services configuration data may include data for virtual private cloud networks for an account and/or in one or more subnetworks, security groups, and network access control lists. The cloud computing services configuration data may include elastic computing services, cloud-based code execution services, containers, and the like. The cloud storage services configuration data may include storage bucket names and object names. The domain routing services configuration data may include defined hosted zones and DNS configurations. For any identified service of the one or more cloud-based services 108, the system 106 iteratively may request configuration details from the API endpoints of the one or more cloud-based services 108. For example, the request at step 110 may include a request for a list of API calls made to the endpoints of the one or more cloud-based services 108. The system 106 may use natural language processing to identify the personal information. Different processing services and techniques may be used to identify specific personal data (e.g., a service for identifying PHI and a service for identifier PII). When the personal information is identified, the system 106 may notify a messaging service (e.g., as shown in FIG. 2) to send the indication in step 120.

In one or more embodiments, the personal information may include biometric information, medical information, personally identifiable financial information, unique identifiers such as Social Security numbers, mental and/or physical health records, records of healthcare provided to a patient, payment records for the provision of healthcare to a patient, addresses, names, dates of birth, billing information, and the like.

In one or more embodiments, the device 104 may include a personal computer (PC), a smart home device, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Figure 2:
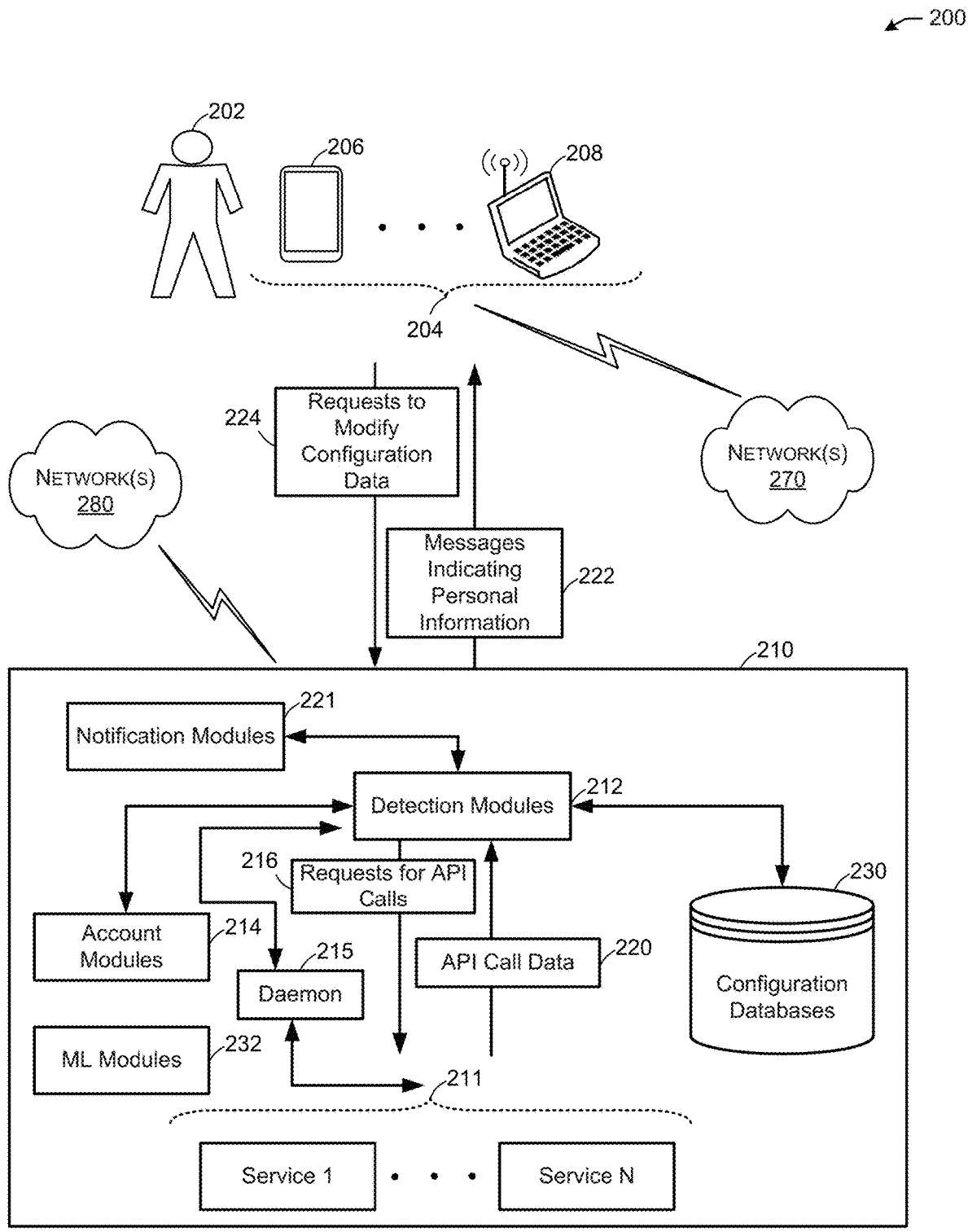
FIG. 2 illustrates a system for detecting personal information in cloud-based infrastructure configurations, in accordance with one or more example embodiments of the present disclosure.

FIG. 2 illustrates a system 200 for detecting personal information in cloud-based infrastructure configurations, in accordance with one or more example embodiments of the present disclosure.

Referring to FIG. 2, the system 200 may include a user 202 (e.g., similar to the user 102 of FIG. 1) of one or more devices 204 (e.g., device 206, device 208—similar to the device 104 of FIG. 1), and a system 210 (e.g., a computer-based system such as a cloud-based network system with one or more servers) that the one or more devices 204 may access remotely to use one or more cloud-based services 211 (e.g., service 1-service N, which may include services such as routing services, elastic computing instances, elastic load balancers, cloud storage services, and the like that may execute in the system 210 remote from the one or more devices 204). The system 210 may include one or more detection modules 212 (e.g., personal data detection modules for identifying personal information in the configuration data of the one or more cloud-based services 211 or elsewhere). The system 210 may include one or more account modules 214 for managing accounts (e.g., for the user 202 or other users and/or organizations). The one or more account modules 214 may manage the roles/permissions (e.g., read, write, execute, delete, etc.) of any users of the one or more cloud-based services 211. The one or more account modules 214 may manage roles/permissions of a daemon 215 that the one or more detection modules 212 may execute to request data from the one or more cloud-based services 211.

Still referring to FIG. 2, the one or more detection modules 212 may send (e.g., using a daemon with read access to the one or more cloud-based services 211) requests 216 for API call data (e.g., a list of API calls associated with the one or more cloud-based services 211). The one or more detection modules 212 may iterate over any of the one or more cloud-based services 211 based on an account and/or location associated with the user 202, and may identify any user-configured services deployed. Based on the services, the one or more detection modules 212 may use a daemon or multiple daemons (or other services) with read access to the one or more cloud-based services 211 to send the requests 216. The one or more cloud-based services 211 may send to the one or more detection modules 212 API call data 220 (e.g., data of API calls, including the API call payloads). The one or more detection modules 212 may analyze the payloads of the API calls of the one or more cloud-based services 211 to identify personal information in the configuration data for the one or more cloud-based services 211. When the one or more detection modules 212 identify personal information in the configuration data of the one or more cloud-based services 211, the one or more detection modules 212 may notify one or more notification modules of the personal information detected and for which service of the one or more cloud-based services 211. The API call data may include text that includes configuration data, and the characters strings of the text may be analyzed individually or in combination (e.g., by concatenating the character strings of multiple API call payloads) by the one or more detection modules 212. The interface used by the one or more detection modules 212 to send the requests 216 may be a standard interface across multiple providers of the one or more cloud-based services 211.

Still referring to FIG. 2, the one or more detection modules 212 may send messages 222 to the one or more devices 204 to indicate to the user 202 that personal information was identified in the configuration data for one or more cloud-based services 211, what the personal information identified is, where the personal information was identified, and the like. The one or more devices 204 may present the messages (e.g., similar to step 122 of FIG. 1 and shown further in FIG. 3) to the user 202, and when the user provides inputs requesting a modification, the one or more devices 204 may send requests 224 to the system 210 indicating that the user 202 requests to modify the configuration data. The requests 224 may include selections of the configuration data to modify, and may include computer-based functions or scripts uploaded to the system 210, which may execute the computer-based functions or scripts, thereby causing the modification to the configuration data (e.g., removal of the personal data from the configuration data, or modifying the personal data to include different information). The system 210 may include one or more configuration databases 230 (e.g., data stores) that may track the API call data 220 at different times so that the system 210 may determine the configuration data of the one or more cloud-based services 211 at any given time, allowing the system 210 to identify changes to the API call data 220 (e.g., when a change is identified, the system 210 may analyze the API call data 220 that experienced a modification to determine whether the modification included the addition of personal information in configuration data of the one or more cloud-based services 211). The system 210 may include one or more machine learning (ML) modules 232 for using human operator feedback to determine whether the user 202 has sent the requests 224 in response to the messages 222 indicating the presence of certain personal information. When a user preference and/or the one or more ML modules 232 determine that the user 202 is likely to request a modification to configuration data that includes certain types of personal information, the one or more notification modules 221 may send the messages 222, otherwise the system 210 may refrain from sending the messages 222 (e.g., when the user 202 has not requested modifications to the presence of the same type of personal information previously present in configuration data).

In one or more embodiments, the daemon 215 may facilitate real-time monitoring of API calls made using the one or more cloud-based services 211. When the daemon 215 identifies API calls with configuration data in the API call payloads, the daemon 215 may provide the configuration data to the one or more detection modules 212 for analysis regarding whether the configuration data includes personal information. In real-time monitoring, the daemon 215 may be inserted as a blocker to identify the API call data 220, and may either pass the API call data 220 to the one or more detection modules 212.

In one or more embodiments, requests 224 may include executing a computer function or script that causes removal of or changes to the personal information, or may include using real-time hashing to replace the personal information with other information that is permitted. For example, the personal information may be replaced with an injection of a hash of data that maps to the personal information using a look-up table. The requests 224 may include a mapping table that may be stored by the system 210 and used to map the hashed data to the corresponding personal information that is to be replaced based on the requests 224.

Examples, as described herein, may include or may operate on logic or a number of components, modules, or mechanisms. Modules, such as the one or more detection modules 212, the one or more account modules 214, the one or more notification modules 221, and/or the one or more ML modules 232 may be tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The one or more devices 204 may be configured to communicate via a communications network 270, and the system 210 may be configured to communicate via a communications network 280, wirelessly or wired (e.g., the same or different wireless communications networks). The communications network 270 and/or the communications network 280 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 270 and/or the communications network 280 may have any suitable communication range associated therewith and may include, for example, global networks (e.g., the Internet), metropolitan area networks (MANs), wide area networks (WANs), local area networks (LANs), or personal area networks (PANs). In addition, the communications network 270 and/or the communications network 280 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The one or more devices 204 and/or the system 210 may include any suitable processor-driven device including, but not limited to, a mobile device or a non-mobile, e.g., a static, device. For example, the one or more devices 204 and/or the system 210 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Figure 3:
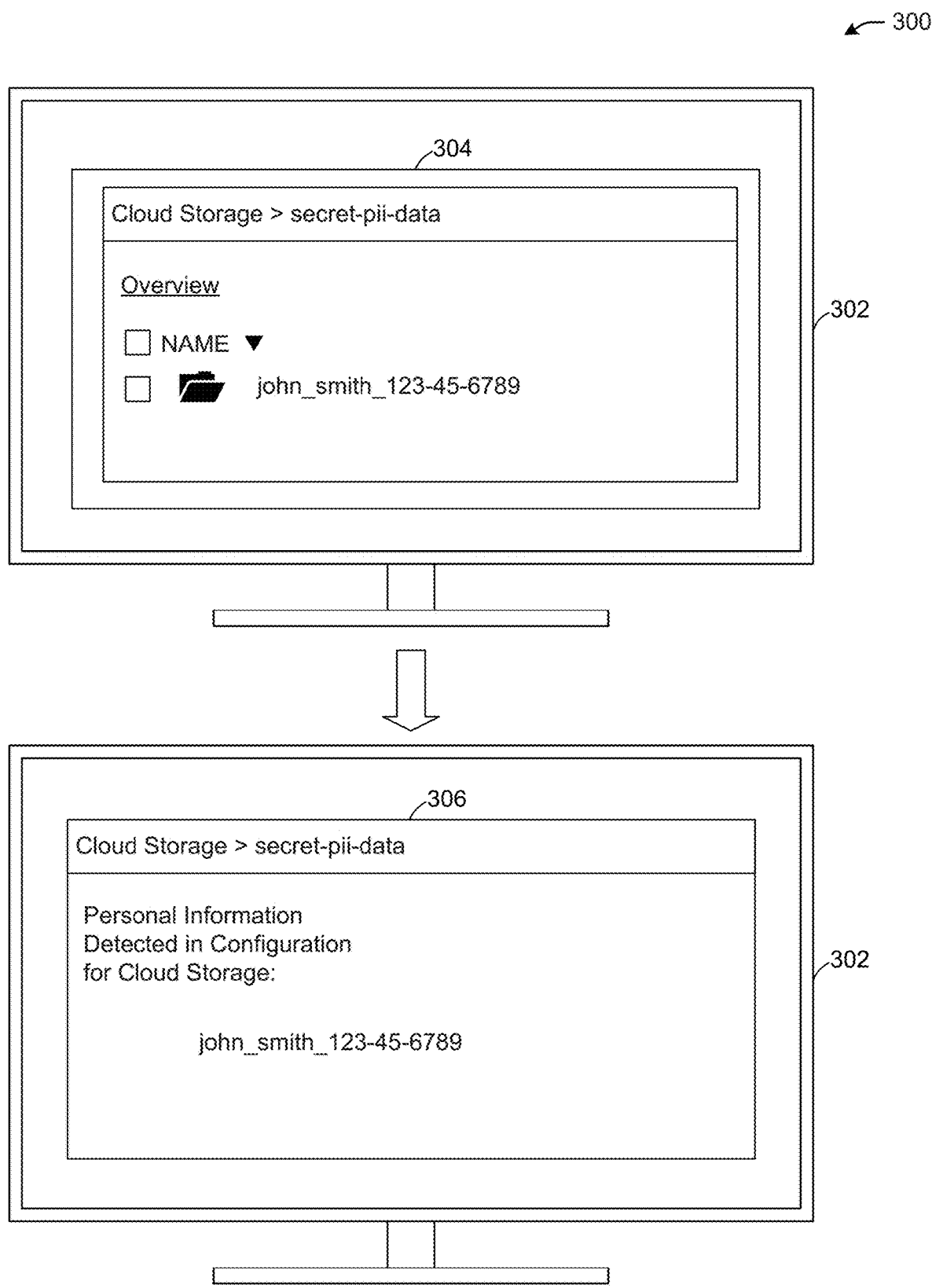
FIG. 3 illustrates example user interfaces for notifying users of detected personal information in cloud-based infrastructure configurations, in accordance with one or more example embodiments of the present disclosure.

FIG. 3 illustrates example user interfaces 300 for notifying users of detected personal information in cloud-based infrastructure configurations, in accordance with one or more example embodiments of the present disclosure.

Referring to FIG. 3, a device 302 (e.g., similar to the device 104 of FIG. 4 and to the one or more devices 204 of FIG. 2) may present an interface 304. For example, the interface may indicate that a cloud storage service (e.g., a service of the one or more cloud-based services 211) is configured as a storage bucket "secret-pii-data" (e.g., PII data), and that the storage bucket may include prefixes (e.g., folders) for users (e.g., healthcare patients) using the pattern <patient name>_<Social Security Number>. As shown, a storage bucket may be called "john_smith_123-45-6789" to represent patient John Smith with a Social Security number of 123-45-6789 as configuration data for the cloud storage service. While the pattern used for the prefixes may be a convenient convention for users, it may expose PII (e.g., a person's name and Social Security number) at the configuration level of the cloud storage service.

Still referring to FIG. 3, when the PII has been identified (e.g., similar to step 116 of FIG. 1), the device 302 may present another interface 306 (e.g., similar to step 122 of FIG. 1). The interface 306 may present an indication that PII has been identified in the cloud storage service, specifically in the "john_smith_123-45-6789" prefix. While FIG. 3 shows a cloud storage service and specific PII being exposed, other services and types of personal information may be indicated in similar fashion using the interface 304 and the interface 306. The interface 306 may indicate that the personal information was remediated automatically, or may present selectable options for a user to indicate whether and how to remediate the detected personal information.

Figure 4A:
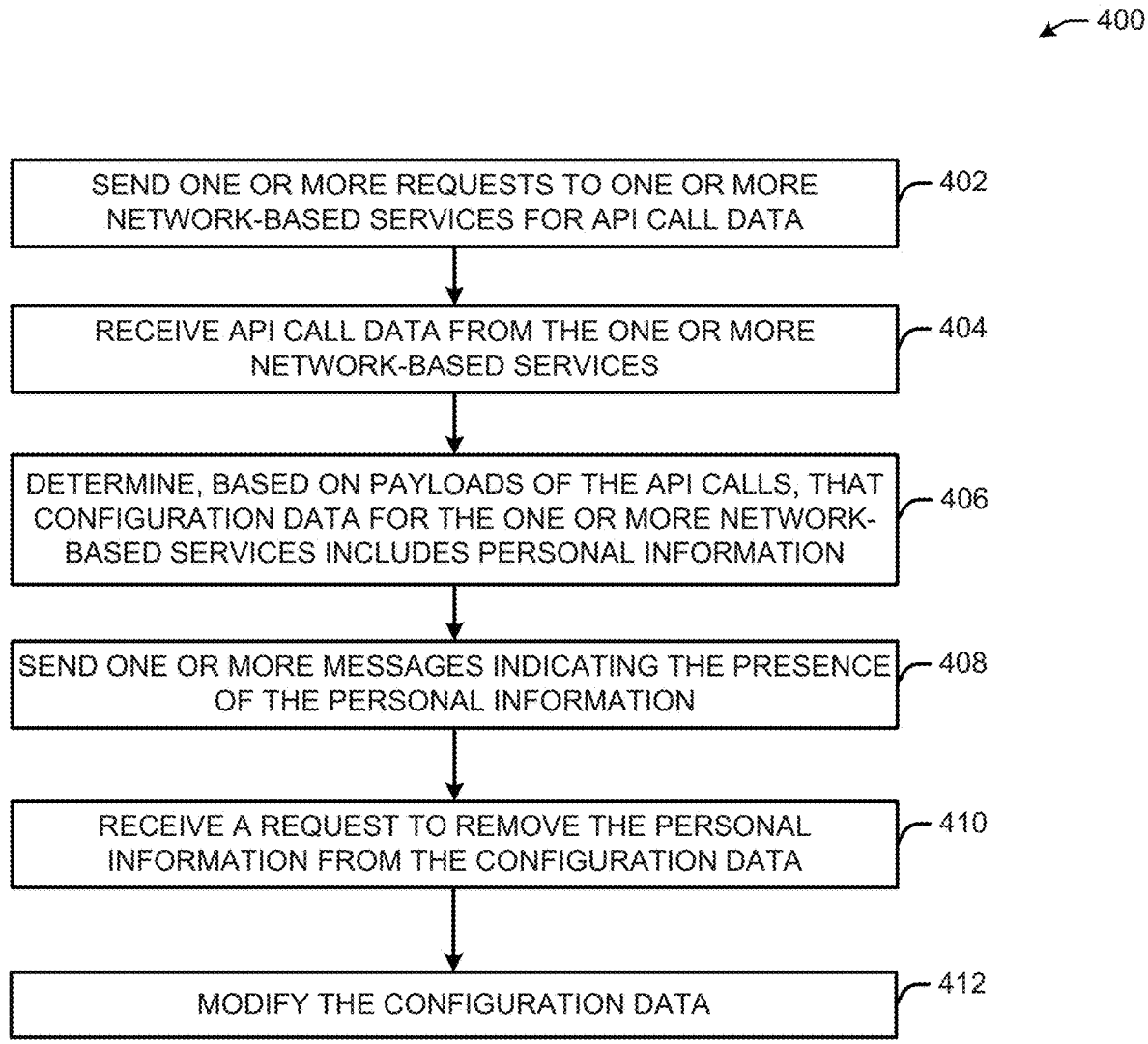
FIG. 4A illustrates a flow diagram for a process for detecting personal information in cloud-based infrastructure configurations, in accordance with one or more example embodiments of the present disclosure.

FIG. 4A illustrates a flow diagram for a process 400 for detecting personal information in cloud-based infrastructure configurations, in accordance with one or more example embodiments of the present disclosure.

At block 402, a network-based device (e.g., a computer-based system, or apparatus, etc., e.g., the system 106 of FIG. 1, the system 210 of FIG. 2) may send one or more requests (e.g., step 110 of FIG. 1, the requests 216 of FIG. 2) to one or more network-based services (e.g., the one or more cloud-based services 211 of FIG. 2) for API call data. For example, the API call data may include data for virtual private cloud networks for an account and/or in one or more subnetworks, security groups, and network access control lists. The API call data may include configuration data for cloud computing services, such as elastic computing services, cloud-based code execution services, containers, and the like. The cloud storage services configuration data may include storage bucket names and object names. For example, the request may include a request for a list of API calls made to the endpoints of the one or more network-based services. To send the requests, the network-based device may execute a daemon with read access to the network-based services, the execution resulting in a request for the API call data.

At block 404, the network-based device may receive the API call data from the one or more network-based services. The API call data may include the API calls using the one or more network-based services, including the API call payloads (e.g., JSON payloads indicating configuration data of the network-based services).

At block 406, the network-based device may determine, based on the payloads of the API calls of the API call data, that configuration data (e.g., data at the configuration levels of the network-based services, such as folder/file names, service names, file paths, etc.) may include personal information, such as PII, PHI, and/or any other sensitive information as defined by laws, policies, user preferences, service agreements, or any other source. The network-based device may use natural language processing techniques to identify character strings, words, numbers, and the like which may match known forms of personal information.

At block 408, responsive to identifying the personal information in the API call payloads, the network-based device may send one or more messages (e.g., the messages 222 of FIG. 2, the interface 306 and associated interface data of FIG. 3) indicating the presence of the personal information, the service whose configuration data includes the personal information, and any other relevant information (e.g., that the personal information is included in a file name or service name, etc.). The one or more messages may be tailored to a type of device used for display, and may be in one of a variety of formats.

At block 410, the network-based device may receive a request (e.g., the requests 224 of FIG. 2) to remove the personal information from the configuration data of the one or more network-based services. The request may indicate the specific network-based service and configuration data to modify, the modification (e.g., a different name or information that does not include the personal information). The request may include the uploading of computer-based functions or scripts that the network-based device may execute, thereby causing the deletion or replacement of the personal information identified in the configuration data of the network-based services at block 412. The request may include information with which to replace the personal information in the configuration data, the replacement information may not include personal information.

Figure 4B:
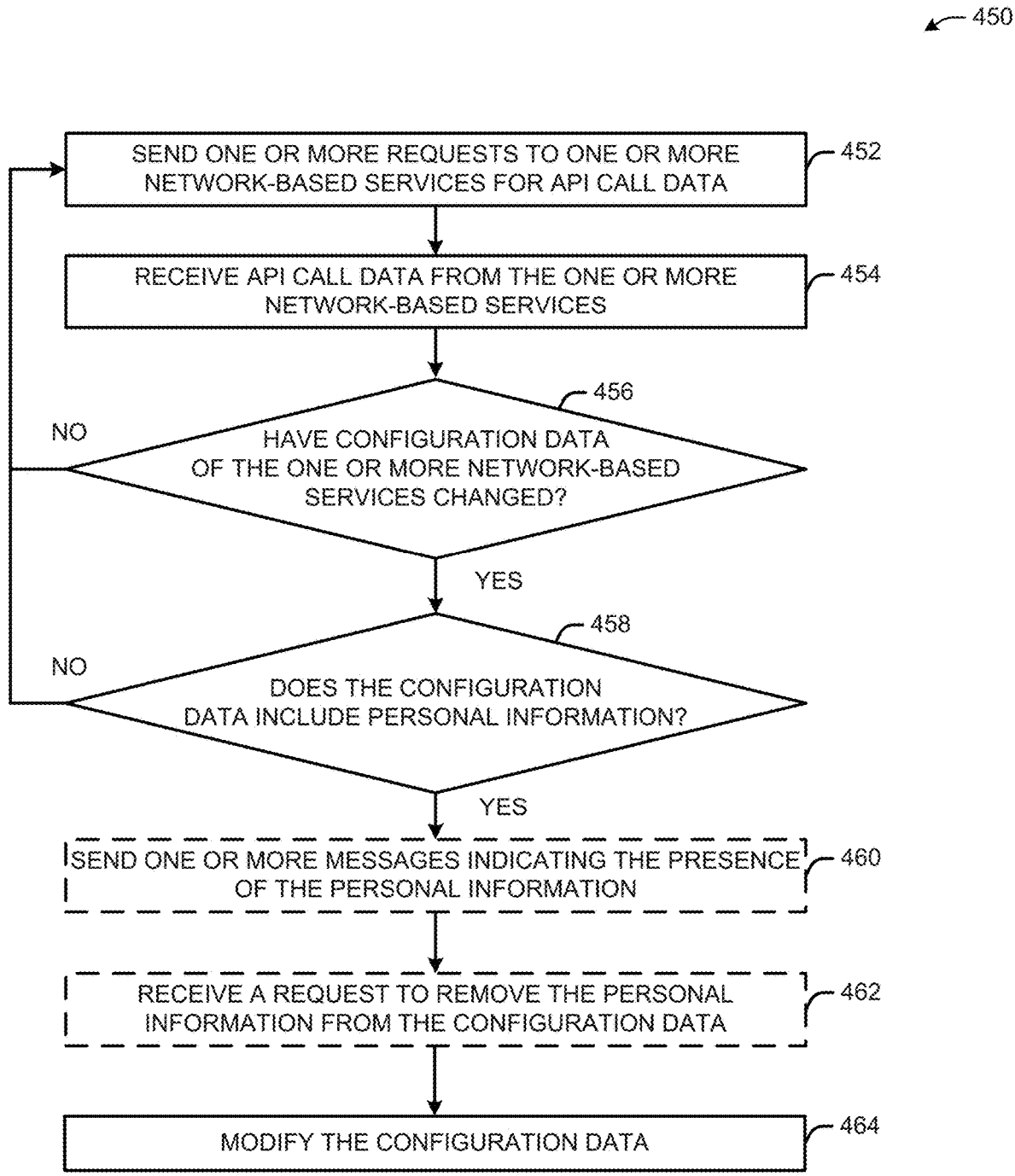
FIG. 4B illustrates a flow diagram for a process for detecting personal information in cloud-based infrastructure configurations, in accordance with one or more example embodiments of the present disclosure.

FIG. 4B illustrates a flow diagram for a process 450 for detecting personal information in cloud-based infrastructure configurations, in accordance with one or more example embodiments of the present disclosure.

At block 452, a network-based device (or system, or apparatus, etc., e.g., the system 106 of FIG. 1, the system 210 of FIG. 2) may send one or more requests (e.g., step 110 of FIG. 1, the requests 216 of FIG. 2) to one or more network-based services (e.g., the one or more cloud-based services 211 of FIG. 2) for API call data. For example, the API call data may include data for virtual private cloud networks for an account and/or in one or more subnetworks, security groups, and network access control lists. The API call data may include configuration data for cloud computing services, such as elastic computing services, cloud-based code execution services, containers, and the like. The cloud storage services configuration data may include storage bucket names and object names. For example, the request may include a request for a list of API calls made to the endpoints of the one or more network-based services. To send the requests, the network-based device may execute a daemon with read access to the network-based services, the execution resulting in a request for the API call data.

At block 454, the network-based device may receive the API call data from the one or more network-based services. The API call data may include the API calls using the one or more network-based services, including the API call payloads (e.g., JSON payloads indicating configuration data of the network-based services).

At block 456, the network-based device may determine whether the configuration data of the one or more network-based services have changed (e.g., since a previous request/analysis of the network-based device). The network-based device may maintain data from previously analyzed API calls and may compare the API call payloads of the previously analyzed API calls to the most recently received API call data to determine whether any configuration data has changed. For example, when API call payloads indicate that data the configuration level of a network-based service (e.g., file names, file paths, service names, etc.) in the most recent API calls is different from the configuration level data of previous API calls or that the most recent API call payloads indicate an addition of personal information to configuration-level data, the network-based device may determine that configuration data has changed, and may proceed to block 458. Otherwise, the network-based device may return to block 452 at a later time to request the next set of API calls.

At block 458, the network-based device may determine whether the configuration data includes personal information. For example, the network-based device may determine (or may request that another device determine), based on the payloads of the API calls of the API call data, that configuration data (e.g., data at the configuration levels of the network-based services, such as folder/file names, service names, file paths, etc.) may include personal information, such as PII, PHI, and/or any other sensitive information as defined by laws, policies, user preferences, service agreements, or any other source. The network-based device may use natural language processing techniques to identify character strings, words, numbers, and the like which may match known forms of personal information. When the network-based device determines that no personal information is in the configuration data of any network-based services, the network-based device may return to block 452 at a later time to request the next set of API calls. When the network-based device determines that personal information is in the configuration data of a network-based service, the process 450 may continue at block 460 or may continue at block 464. In this manner, the network-based device may avoid searching API payload data for personal information that may have been already detected in a prior analysis, for example.

At block 460, responsive to identifying the personal information in the API call payloads, the network-based device optionally may send one or more messages (e.g., the messages 222 of FIG. 2, the interface 306 and associated interface data of FIG. 3) indicating the presence of the personal information, the service whose configuration data includes the personal information, and any other relevant information (e.g., that the personal information is included in a file name or service name, etc.). The one or more messages may be tailored to a type of device used for display, and may be in one of a variety of formats.

At block 462, the network-based device optionally may receive a request (e.g., the requests 224 of FIG. 2) to remove the personal information from the configuration data of the one or more network-based services. The request may indicate the specific network-based service and configuration data to modify, the modification (e.g., a different name or information that does not include the personal information). The request may include the uploading of computer-based functions or scripts that the network-based device may execute, thereby causing the deletion or replacement of the personal information identified in the configuration data of the network-based services at block 464. The modification at block 464 may include real-time hashing to replace the personal information, and may replace the personal information automatically (e.g., without block 460 and block 462). For example, a modification may include deleting the personal information and replacing the deleted personal information with other information. Alternatively, the device may modify the configuration data automatically by removing or replacing the personal information in the configuration data. The request may include information with which to replace the personal information in the configuration data, the replacement information may not include personal information.

Figure 4C:
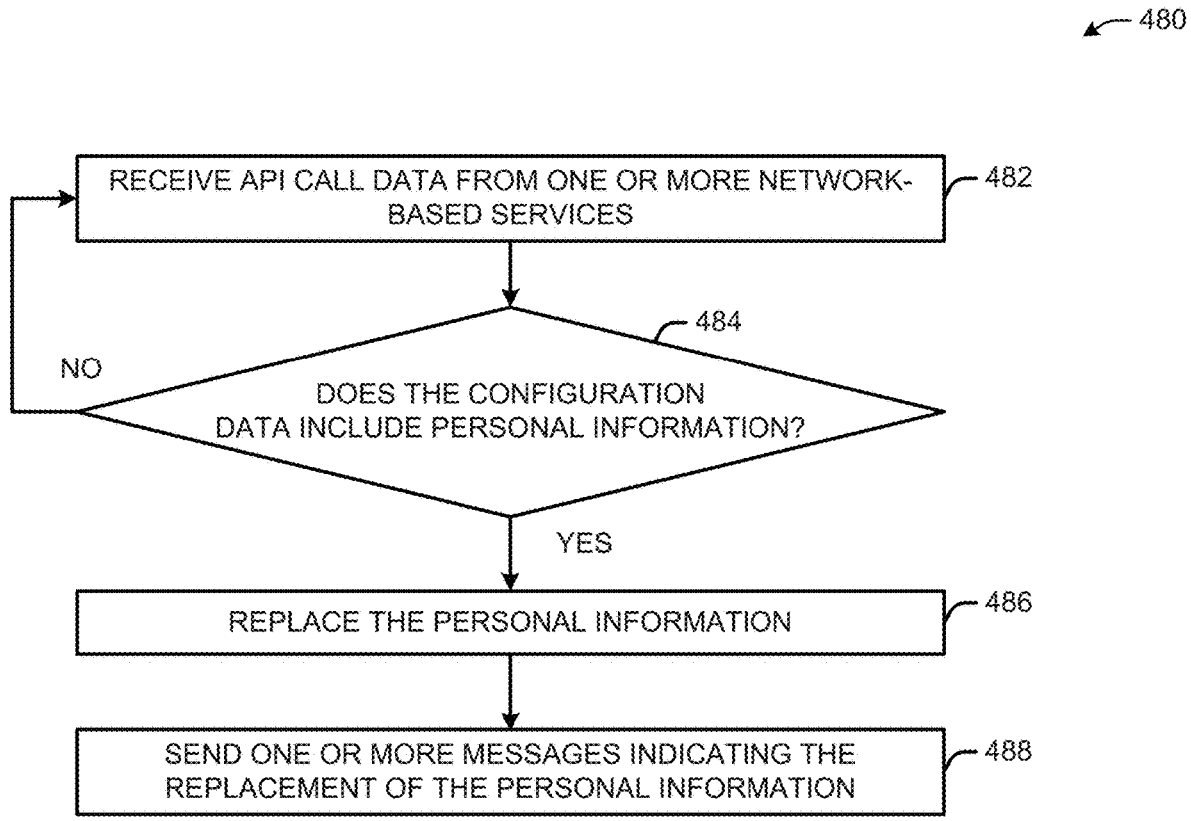
FIG. 4C illustrates a flow diagram for a process for detecting personal information in cloud-based infrastructure configurations, in accordance with one or more example embodiments of the present disclosure.

FIG. 4C illustrates a flow diagram for a process 480 for detecting personal information in cloud-based infrastructure configurations, in accordance with one or more example embodiments of the present disclosure.

At block 482, a network-based device (or system, or apparatus, etc., e.g., the system 106 of FIG. 1, the system 210 of FIG. 2) may receive API call data from the one or more network-based services. The API call data may include the API calls using the one or more network-based services, including the API call payloads (e.g., JSON payloads indicating configuration data of the network-based services). The network-based system may request the API call data or may insert a blocker to intercept the API call data in real-time as API calls are made.

At block 484, the network-based device may determine whether the configuration data that is included in the payloads of the API call data includes personal information such as PII or PHI. The network-based device may analyze, sequentially or concurrently, the character strings of one or more API call payloads for configuration data included in the API call payloads. The network-based device may analyze any individual character string from an API call payload, or may concatenate multiple character strings from multiple API call payloads and determine whether any of the character strings indicate that configuration data for the one or more network-based services include personal information. When the configuration data includes personal information, the process 480 may return to block 486. When the configuration data does not include personal information, the process 480 may return to block 482 to receive additional API call data for analysis.

At block 486, the device may replace the personal information by deleting the personal information from the configuration data and/or adding different information (e.g., information not including the personal information) to the configuration data. The replacement may be automatic without requiring an explicit user input, and may include identification of previous modifications to the same or similar personal information, or may include using a look-up table to map provided configuration data to the personal information that is to be replaced.

At block 488, the device may send one or more messages indicating that the personal information was replaced using automatic remediation. The messages may request feedback from a user that the automatic remediation was appropriate, and may indicate the services and configuration data where the personal information was identified.

Figure 5:
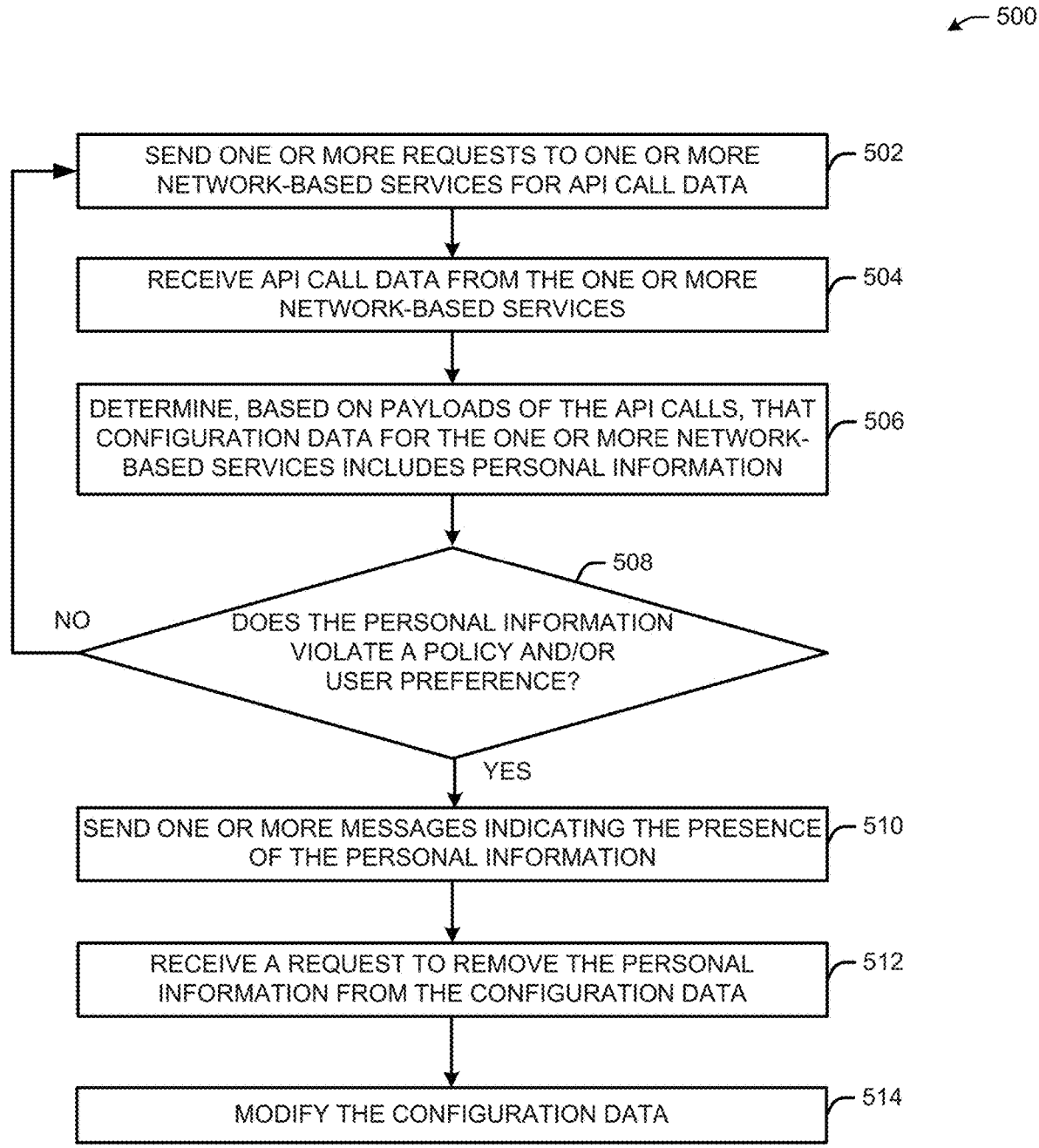
FIG. 5 illustrates a flow diagram for a process for detecting personal information in cloud-based infrastructure configurations, in accordance with one or more example embodiments of the present disclosure.

FIG. 5 illustrates a flow diagram for a process 500 for detecting personal information in cloud-based infrastructure configurations, in accordance with one or more example embodiments of the present disclosure.

At block 502, a network-based device (or system, or apparatus, etc., e.g., the system 106 of FIG. 1, the system 210 of FIG. 2) may send one or more requests (e.g., step 110 of FIG. 1, the requests 216 of FIG. 2) to one or more network-based services (e.g., the one or more cloud-based services 211 of FIG. 2) for API call data. For example, the API call data may include data for virtual private cloud networks for an account and/or in one or more subnetworks, security groups, and network access control lists. The API call data may include configuration data for cloud computing services, such as elastic computing services, cloud-based code execution services, containers, and the like. The cloud storage services configuration data may include storage bucket names and object names. For example, the request may include a request for a list of API calls made to the endpoints of the one or more network-based services. To send the requests, the network-based device may execute a daemon with read access to the network-based services, the execution resulting in a request for the API call data.

At block 504, the network-based device may receive the API call data from the one or more network-based services. The API call data may include the API calls using the one or more network-based services, including the API call payloads (e.g., JSON payloads indicating configuration data of the network-based services).

At block 506, the network-based device may determine, based on the payloads of the API calls of the API call data, that configuration data (e.g., data at the configuration levels of the network-based services, such as folder/file names, service names, file paths, etc.) may include personal information, such as PII, PHI, and/or any other sensitive information as defined by laws, policies, user preferences, service agreements, or any other source. The network-based device may use natural language processing techniques to identify character strings, words, numbers, and the like which may match known forms of personal information.

At block 508, the network-based device may determine whether the personal information violates a policy and/or user preference. For example, policies may govern the use of personal information based on relevant laws (e.g., the Health Insurance Portability and Accountability Act), service agreements, and the like. In addition, user preferences, whether explicitly provided or deduced (e.g., using machine learning) from past actions, may indicate whether or not a user is likely to modify the use of personal information in configuration data of a network-based service. When a policy indicates that the personal information identified by the network-based device does not violate a policy and is not likely to be modified by a given user, the process 500 may return to block 502 at a later time to request the next set of API calls. When the network-based device determines that personal information is in the configuration data of a network-based service, the process 500 may continue at block 510.

At block 510, responsive to identifying the personal information in the API call payloads, the network-based device may send one or more messages (e.g., the messages 222 of FIG. 2, the interface 306 and associated interface data of FIG. 3) indicating the presence of the personal information, the service whose configuration data includes the personal information, and any other relevant information (e.g., that the personal information is included in a file name or service name, etc.). The one or more messages may be tailored to a type of device used for display, and may be in one of a variety of formats.

At block 512, the network-based device may receive a request (e.g., the requests 224 of FIG. 2) to remove the personal information from the configuration data of the one or more network-based services. The request may indicate the specific network-based service and configuration data to modify, the modification (e.g., a different name or information that does not include the personal information). The request may include the uploading of computer-based functions or scripts that the network-based device may execute, thereby causing the deletion or replacement of the personal information identified in the configuration data of the network-based services at block 514. For example, a modification may include deleting the personal information and replacing the deleted personal information with other information. The request may include information with which to replace the personal information in the configuration data, the replacement information may not include personal information.

Figure 6:
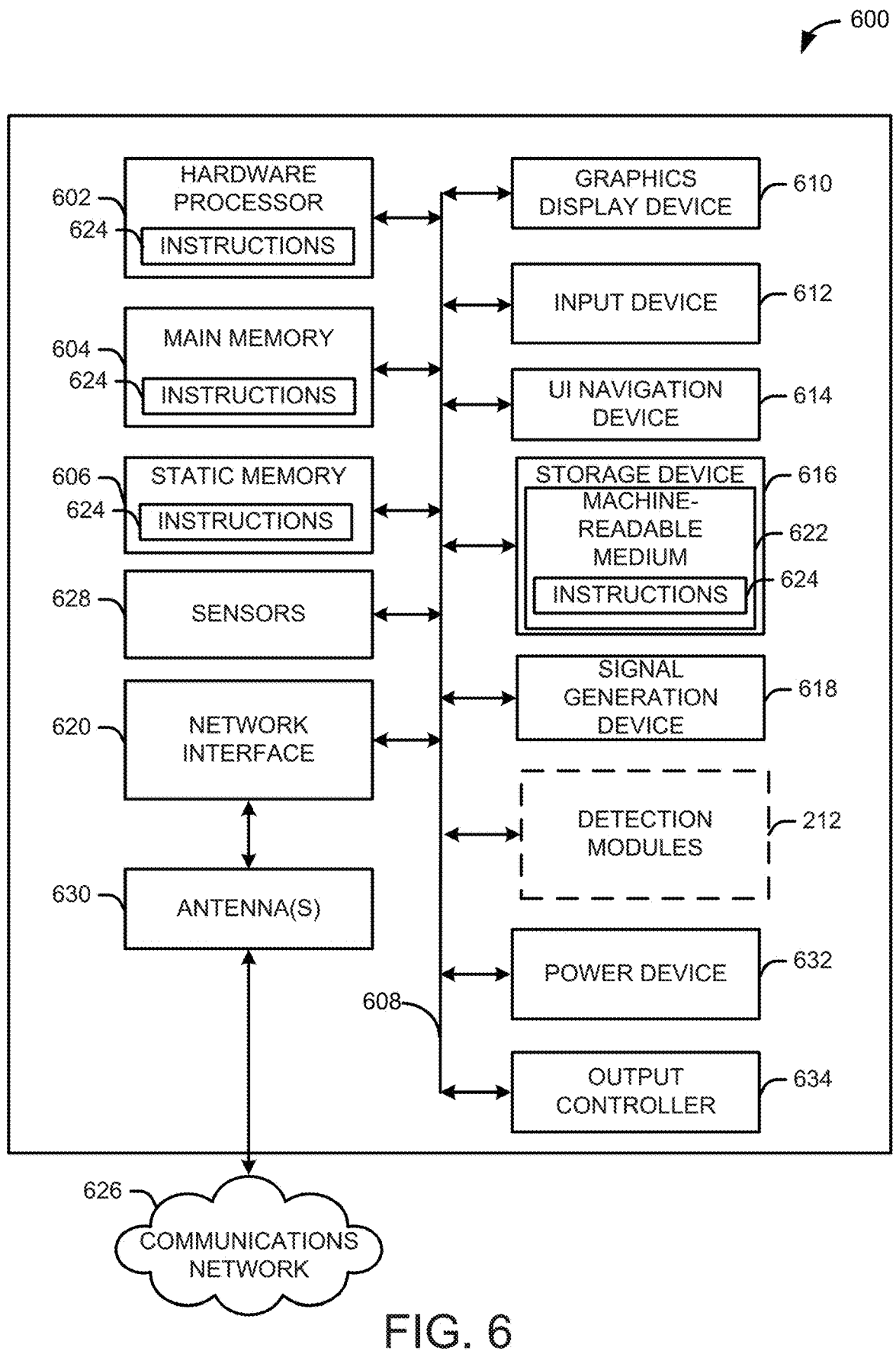
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the device 104 of FIG. 1, the one or more devices 204 of FIG. 2, the system 210 of FIG. 2, the device 302 of FIG. 3) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, the one or more detection modules 212 (e.g., when the machine 600 is implemented in the system 210 of FIG. 2), a network interface device/transceiver 620 coupled to antenna(s) 630, and one or more sensors 628, such as a microphone, a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The invention claimed is:

1. A method comprising:
   sending, by a computer-based system, a first request to a first service associated with the computer-based system, the first request associated with first application programming interface (API) call data;
   sending a second request to a second service associated with the computer-based system, the second request associated with second API call data;
   receiving the first API call data from the first service;
   receiving the second API call data from the second service;
   determining, based on a first payload of the first API call data, first data associated with a first configuration of the first service;
   determining, based on a second payload of the second API call data, second data associated with a second configuration of the second service;
   determining that the first data includes personal information;
   determining an absence of personal information in the second data;
   sending a message to a device, the message indicative of the personal information;
   receiving a third request to delete the first data; and
   replacing the first data with third data based on the third request.

2. The method of claim 1, further comprising receiving a computer function from the device, the computer function including a deletion of the first data, wherein replacing the first data comprises executing the computer function.

3. The method of claim 1, further comprising determining that the first data includes a modification to the third data, the third data associated with third API call data received from the first service prior to receiving the first API call data, wherein determining that the first data include the personal information is based on the modification.

4. The method of claim 1, further comprising receiving a look-up table associated with the first data and the third data, wherein replacing the first data is based on the look-up table.

5. A method comprising:
   receiving, by a computer-based system, first application programming interface (API) call data from a first service associated with the computer-based system;
   receiving second API call data from a second service associated with the computer-based system;
   determining, based on the first API call data, first data associated with the first service, wherein the first API call data are associated with the first data being included in configuration data of the first service;
   determining that the first data includes personal information;
   determining second data, wherein the personal information is absent from the second data;
   determining, based on the second API call data, third data associated with the second service, wherein the second API call data are associated with the third data being included in configuration data of the second service;
   determining an absence of personal information in the third data; and
   replacing the first data with the second data.

6. The method of claim 5, further comprising determining a payload of the first API call data, wherein determining the first data is based on the payload.

7. The method of claim 5, further comprising receiving a computer function from a device, the computer function including a deletion of the first data, wherein deleting the first data comprises executing the computer function.

8. The method of claim 5, further comprising:
executing a daemon having access to the first service; and
sending, based on execution of the daemon, a first request to the first service, the first request associated with the first API call data.

9. The method of claim 5, wherein the first data is associated with routing logic.

10. The method of claim 5, further comprising:
sending a message to a device, the message indicative of the personal information; and
receiving a request to replace the first data with the second data, wherein replacing the first data with the second data is based on the request.

11. The method of claim 10, wherein replacing the first data with the second data is further based on a look-up table associated with the first data and the second data.

12. The method of claim 10, wherein the message is further indicative of the first service and wherein the first data is associated with a file name of the first service.

13. The method of claim 5, further comprising determining a modification associated with the first data, wherein determining that the first data includes personal information is based on the modification.

14. The method of claim 5, further comprising:
determining, based on machine learning data, a user preference associated with the personal information; and
sending a message to a device, the message indicative of the personal information, wherein sending the message is based on the user preference.

15. The method of claim 14, further comprising:
determining, based on payloads of the first API call data, a post endpoint associated with the first API call data; and
determining, based on a policy, that the post endpoint is forbidden, wherein the message is further indicative of the post endpoint.

16. A computer-based system comprising memory coupled to at least one processor, the at least one processor configured to:
receive first application programming interface (API) call data from a first service associated with the computer-based system;
receive second API call data from a second service associated with the computer-based system;
determine, based on the first API call data, first data associated with the first service, wherein the API call is associated with the first data being included in configuration data of the first service;
determine that the first data includes personal information;
determine second data, wherein the personal information is absent from the second data;
determine, based on the second API call data, third data associated with the second service, wherein the second API call data are associated with the third data being included in configuration data of the second service;
determine an absence of personal information in the third data; and
replace the first data with the second data.

17. The system of claim 16, wherein the at least one processor is further configured to:
determine a first payload of the first API call data and a second payload of the first API call data; and
concatenate the first payload and the second payload, wherein to determine the first data is based on the first payload concatenated with the second payload.

18. The system of claim 16, wherein the at least one processor is further configured to receive a computer function from a device, the computer function including a deletion of the first data, wherein to replace the first data comprises to execute the computer function.

19. The system of claim 16, wherein to replace the first data with the second data is further based on a look-up table associated with the first data and the second data.

20. The system of claim 16, wherein the at least one processor is further configured to:
send a message to a device, the message indicative of the personal information; and
receive a request to replace the first data with the second data, wherein to replace the first data with the second data is based on the request.

* * * * *